US 12,284,952 B2

(12) United States Patent
Takahashi et al.

(10) Patent No.: US 12,284,952 B2
(45) Date of Patent: Apr. 29, 2025

(54) WORKING MACHINE

(71) Applicant: MAKITA CORPORATION, Anjo (JP)

(72) Inventors: Satoshi Takahashi, Anjo (JP); Akira Shimizu, Anjo (JP)

(73) Assignee: MAKITA CORPORATION, Anjo (JP)

( * ) Notice: Subject to any disclaimer, the term of this patent is extended or adjusted under 35 U.S.C. 154(b) by 230 days.

(21) Appl. No.: 17/876,061

(22) Filed: Jul. 28, 2022

(65) Prior Publication Data
US 2023/0041828 A1     Feb. 9, 2023

(30) Foreign Application Priority Data

Aug. 6, 2021  (JP) ................. 2021-130243

(51) Int. Cl.
*A01G 3/053*    (2006.01)
*B25F 5/02*     (2006.01)

(52) U.S. Cl.
CPC ............... *A01G 3/053* (2013.01); *B25F 5/02* (2013.01)

(58) Field of Classification Search
CPC .......... A01G 3/053; A01G 3/04; A01G 3/047; A01G 3/0475; A01G 3/086; B25F 5/02; B27B 17/00; B27B 17/0008; B27B 17/0033
USPC ......... 30/216, 194, 196, 197, 198, 199, 208, 30/210, 211, 241, 252
See application file for complete search history.

(56) References Cited

U.S. PATENT DOCUMENTS

| 2,588,482 | A | * | 3/1952 | Chapman | ................ F16D 43/18 |
| | | | | | 192/105 CD |
| 11,723,314 | B2 | * | 8/2023 | Ito | ......................... A01G 3/086 |
| | | | | | 30/211 |
| 2004/0128837 | A1 | | 7/2004 | Kramer | |
| 2005/0115340 | A1 | * | 6/2005 | Sasaki | .................... A01G 3/053 |
| | | | | | 74/25 |
| 2009/0064504 | A1 | * | 3/2009 | Kodama | ................ A01G 3/053 |
| | | | | | 30/296.1 |
| 2021/0015034 | A1 | | 1/2021 | Ito et al. | |

FOREIGN PATENT DOCUMENTS

JP           2021-016328 A       2/2021

OTHER PUBLICATIONS

Communication issued Feb. 4, 2025 in Japanese Application No. 2021-130243.

* cited by examiner

*Primary Examiner* — Phong H Nguyen
(74) *Attorney, Agent, or Firm* — Sughrue Mion, PLLC

(57) ABSTRACT

A working machine may include: a working part; a prime mover configured to drive the working part; a housing supporting the working part; a handle attached to the housing such that the handle is rotatable about a rotation axis with respect to the housing and configured to be grasped by a user; and an elastic member arranged between the housing and the handle. The housing may comprise a first surface. The handle may include a second surface that faces the first surface in a rotation axis direction with an interval therebetween. The elastic member may be arranged between the first surface and the second surface.

9 Claims, 15 Drawing Sheets

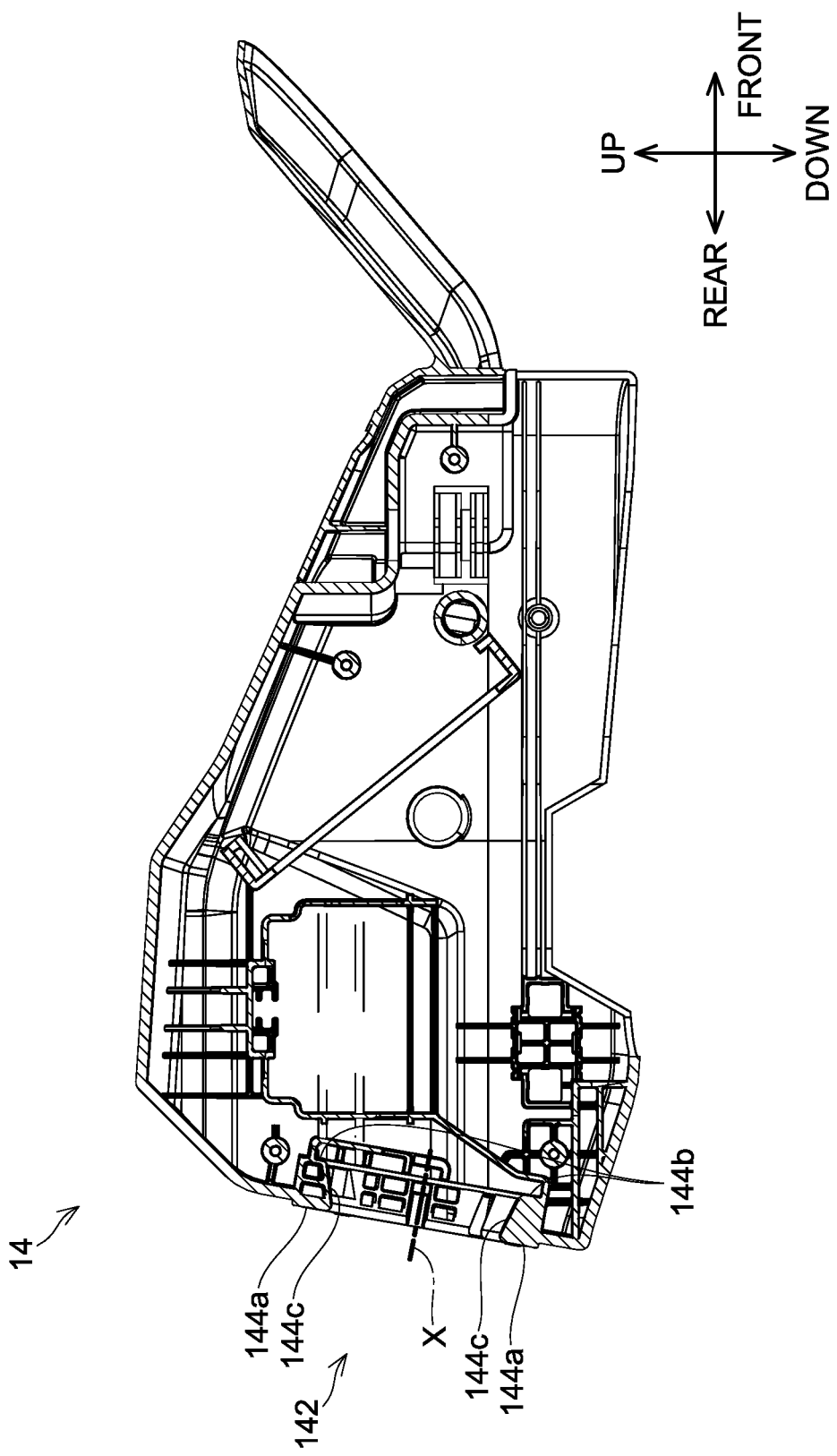

FIG. 9
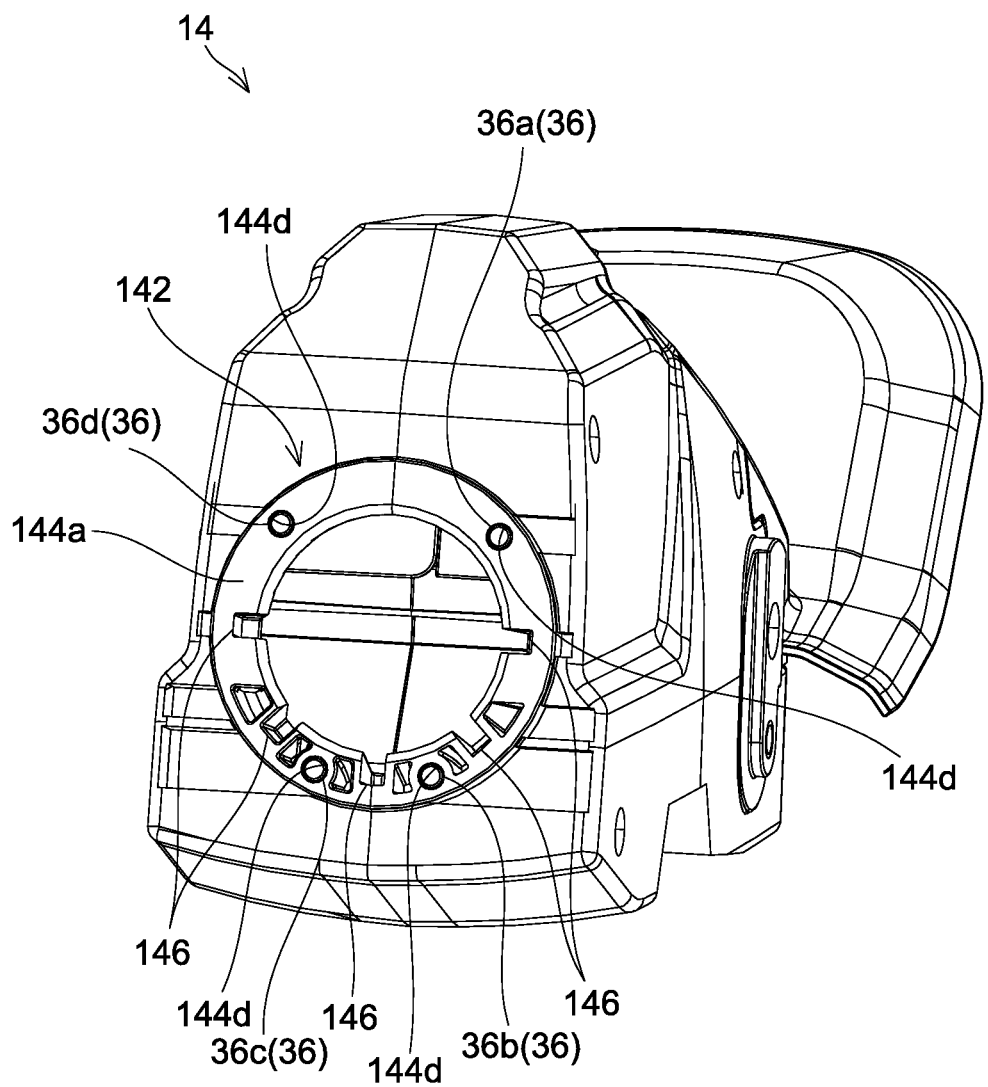
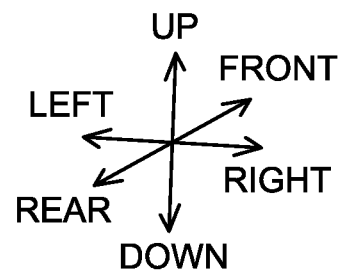

REAR DIRECTION ⟵⟶ FRONT DIRECTION
(FIRST DIRECTION)         (SECOND DIRECTION)

REAR DIRECTION ⟵⟶ FRONT DIRECTION
(SECOND DIRECTION)   (FIRST DIRECTION)

REAR DIRECTION ⟵⟶ FRONT DIRECTION

REAR DIRECTION ←——→ FRONT DIRECTION

WORKING MACHINE

CROSS-REFERENCE TO RELATED APPLICATION

This application claims priority to Japanese Patent Application No. 2021-130243, filed on Aug. 6, 2021, the entire contents of which are incorporated herein by reference.

TECHNICAL FIELD

The technique disclosed herein relates to working machines.

BACKGROUND

US Patent Application Publication No. 2004/0128837 describes a working machine including a working part, a prime mover configured to drive the working part, a housing supporting the working part, and a handle attached to the housing such that the handle is rotatable about a rotation axis with respect to the housing and configured to be grasped by a user. The housing includes a first surface. The handle includes a second surface that faces the first surface with an interval therebetween.

SUMMARY

In a working machine in which a handle is attached to a housing such that the handle is rotatable with respect to the housing, such as the one described in US Patent Application Publication No. 2004/0128837, backlash may occur between the handle and the housing. The disclosure herein provides a technique for reducing backlash between a handle and a housing in a working machine in which the handle is attached to the housing such that the handle is rotatable with respect to the housing.

A working machine disclosed herein may comprise: a working part; a prime mover configured to drive the working part; a housing supporting the working part; a handle attached to the housing such that the handle is rotatable about a rotation axis with respect to the housing and configured to be grasped by a user; and an elastic member arranged between the housing and the handle. The housing may comprise a first surface. The handle may comprise a second surface that faces the first surface in a rotation axis direction with an interval therebetween. The elastic member may be arranged between the first surface and the second surface.

According to the configuration above, backlash between the handle and the housing can be reduced by the elastic member arranged between the first surface and the second surface. In the working machine in which the handle is attached to the housing such that the handle is rotatable with respect to the housing, backlash between the handle and the housing can be reduced. Further, according to the configuration above, the elastic member is arranged between the first surface and the second surface, which are arranged in the rotation axis direction with an interval therebetween, and thus backlash between the handle and the housing in the rotation axis direction can be reduced.

Another working machine disclosed herein may comprise: a working part; a prime mover configured to drive the working part; a housing supporting the working part; a handle attached to the housing such that the handle is rotatable about a rotation axis with respect to the housing and configured to be grasped by a user; and an elastic member arranged between the housing and the handle. The housing may comprise a first surface. The handle may comprise a second surface that faces the first surface with an interval therebetween. The elastic member may be arranged between the first surface and the second surface. The elastic member may comprise a plurality of contact portions that is discretely arranged in a circumferential direction of the rotation axis and configured to contact the first surface or the second surface.

According to the configuration above, backlash between the handle and the housing can be reduced by the elastic member arranged between the first surface and the second surface. In the working machine in which the handle is attached to the housing such that the handle is rotatable with respect to the housing, backlash between the handle and the housing can be reduced. Further, according to the configuration above, sliding friction caused when the handle is rotated with respect to the housing can be reduced. This facilitates the rotation of the handle for the user.

BRIEF DESCRIPTION OF DRAWINGS

FIG. 7 is a cross-sectional right side view of the housing 14 of the hedge trimmer 100 according to the first embodiment.

FIG. 9 is a perspective view of the housing 14 of the hedge trimmer 100 according to the first embodiment, as viewed from the upper rear right side.

DESCRIPTION OF EMBODIMENTS

Figure 1:
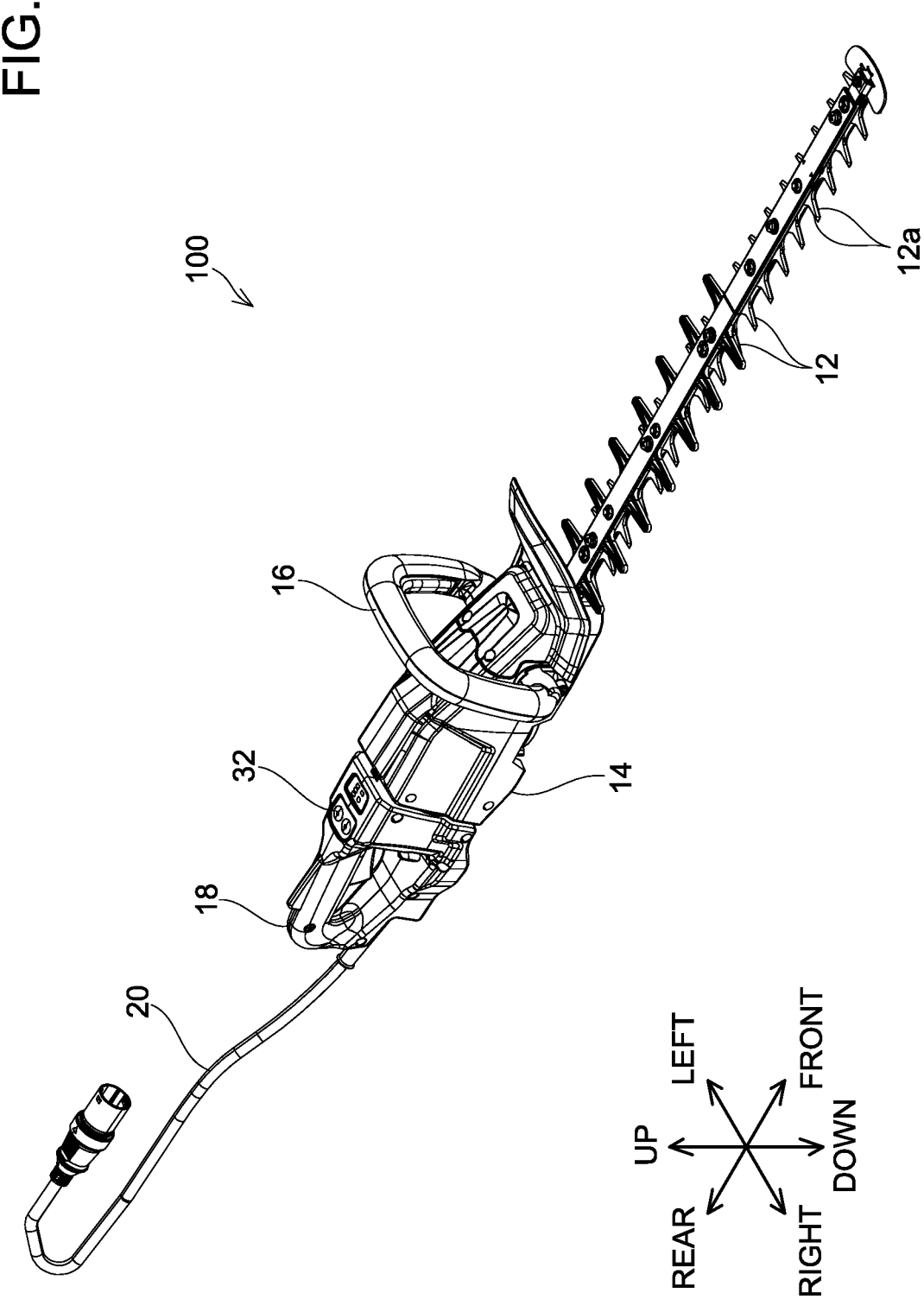
FIG. 1 is a perspective view of a hedge trimmer 100 according to a first embodiment, as viewed from the upper front right side.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved working machines as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, a working machine may comprise: a working part; a prime mover configured to drive the working part; a housing supporting the working part; a handle attached to the housing such that the handle is rotatable about a rotation axis with respect to the housing and configured to be grasped by a user; and an elastic member arranged between the housing and the handle. The housing may comprise a first surface. The handle may comprise a second surface that faces the first surface in a rotation axis direction with an interval therebetween. The elastic member may be arranged between the first surface and the second surface.

According to the configuration above, backlash between the handle and the housing can be reduced by the elastic member arranged between the first surface and the second surface. In the working machine in which the handle is attached to the housing such that the handle is rotatable with respect to the housing, backlash between the handle and the housing can be reduced. Further, according to the configuration above, the elastic member is arranged between the first surface and the second surface, which are arranged in the rotation axis direction with an interval therebetween, and thus backlash between the handle and the housing in the rotation axis direction can be reduced.

In one or more embodiments, one of the housing and the handle may comprise a shaft portion that includes an outer surface, the outer surface decreasing in diameter in a first direction along the rotation axis. Other of the housing and the handle may comprise an engaging portion configured to engage the outer surface of the shaft portion in the first direction. The first surface and the second surface may be offset to the engaging portion in the first direction with respect to the rotation axis direction.

According to the configuration above, engagement of the engaging portion with the outer surface of the shaft portion suppresses the one of the housing and the handle from moving in the first direction with respect to the other of the housing and the handle, and the elastic member suppresses the one of the housing and the handle from moving in the opposite direction to the first direction with respect to the other of the housing and the handle. Further, the engagement of the engaging portion with the outer surface of the shaft portion suppresses the one of the housing and the handle from moving in a direction perpendicular to the rotation axis with respect to the other of the housing and the handle. This configuration can effectively reduce backlash between the handle and the housing.

In one or more embodiments, the elastic member may comprise a plurality of contact portions that is discretely arranged in a circumferential direction of the rotation axis and configured to contact the first surface or the second surface.

According to the configuration above, sliding friction caused when the handle is rotated with respect to the housing can be reduced. This facilitates the rotation of the handle for the user.

In one or more embodiments, a working machine may comprise: a working part; a prime mover configured to drive the working part; a housing supporting the working part; a handle attached to the housing such that the handle is rotatable about a rotation axis with respect to the housing and configured to be grasped by a user; and an elastic member arranged between the housing and the handle. The housing may comprise a first surface. The handle may comprise a second surface that faces the first surface with an interval therebetween. The elastic member may be arranged between the first surface and the second surface. The elastic member may comprise a plurality of contact portions that is discretely arranged in a circumferential direction of the rotation axis and configured to contact the first surface or the second surface.

According to the configuration above, backlash between the handle and the housing can be reduced by the elastic member arranged between the first surface and the second surface. In the working machine in which the handle is attached to the housing such that the handle is rotatable with respect to the housing, backlash between the handle and the housing can be reduced. Further, according to the configuration above, sliding friction caused when the handle is rotated with respect to the housing can be reduced. This facilitates the rotation of the handle for the user.

In one or more embodiments, the rotation axis may be arranged inside a convex polygon that has centers of the plurality of contact portions as vertexes, as viewed in the rotation axis direction.

According to the configuration above, the plurality of contact portions is arranged to surround the rotation axis, and thus backlash between the handle and the housing can be effectively reduced.

In one or more embodiments, each of the plurality of contact portions may comprise a rounded contact surface.

If one or more of the contact portions comprise a flat contact surface, the(se) contact portion(s) may unevenly contact the first surface or the second surface when the handle is rotated with respect to the housing, which may result in increased sliding friction. According to the configuration above, each of the plurality of contact portions comprises a rounded contact surface, and thus sliding friction caused when the handle is rotated with respect to the housing can be reduced. This improves user's comfort.

In one or more embodiments, the elastic member may comprise a plurality of elastic cylindrical members each having an approximately cylindrical shape, an axial direction of the approximately cylindrical shape being along the rotation axis. Each of the plurality of contact portions may be disposed on corresponding one of the plurality of elastic cylindrical members.

According to the configuration above, the elastic member can be easily formed and can be easily assembled to the housing or the handle.

In one or more embodiments, the prime mover may be an electric motor.

In a working machine using an electric motor as its prime mover, vibrations caused by the prime mover being driven are reduced as compared with a working machine using an engine as its prime mover, and thus backlash between the handle and the housing greatly affects the user's feel during use. According to the configuration above, backlash between the handle and the housing can be reduced, and thus the user's comfort can be improved.

First Embodiment

Hereinafter, a hedge trimmer 100 will be described as an example of working machine. The hedge trimmer 100 illustrated in FIG. 1 is a gardening tool that is mainly used to cut hedges and plants. The hedge trimmer 100 comprises a pair of shear blades 12, a housing 14 supporting the pair of shear blades 12, a front handle 16 and a rear handle 18 configured to be grasped by a user, and a power cable 20 for power supply from an external.

The pair of shear blades 12 extends linearly forward horn the housing 14 and comprises a plurality of blade edges 12a along its longitudinal direction. The pair of shear blades 12 cut hedges and plants with the plurality of blade edges 12a by reciprocating with respect to each other. In the hedge trimmer 100 according to the present embodiment, each of the pair of shear blades 12 is configured to reciprocate.

In the present embodiment, the longitudinal direction of the pair of shear blades 12 is defined as a front-rear direction, a direction from the housing 14 toward the pair of shear blades 12 is defined as a front direction, and a direction from the pair of shear blades 12 toward the housing 14 is defined as a rear direction. Further, a direction that is perpendicular to the front-rear direction and parallel to a plane on which the plurality of blade edges 12a of the pair of shear blades 12 is located is defined as a right-left direction. Further, a direction that is perpendicular to the front-rear direction and the right-left direction is defined as an up-down direction, a direction from the pair of shear blades 12 toward the housing 14 is defined as a up direction, and a direction from the housing 14 toward the pair of shear blades 12 is defined as a down direction.

Figure 2:
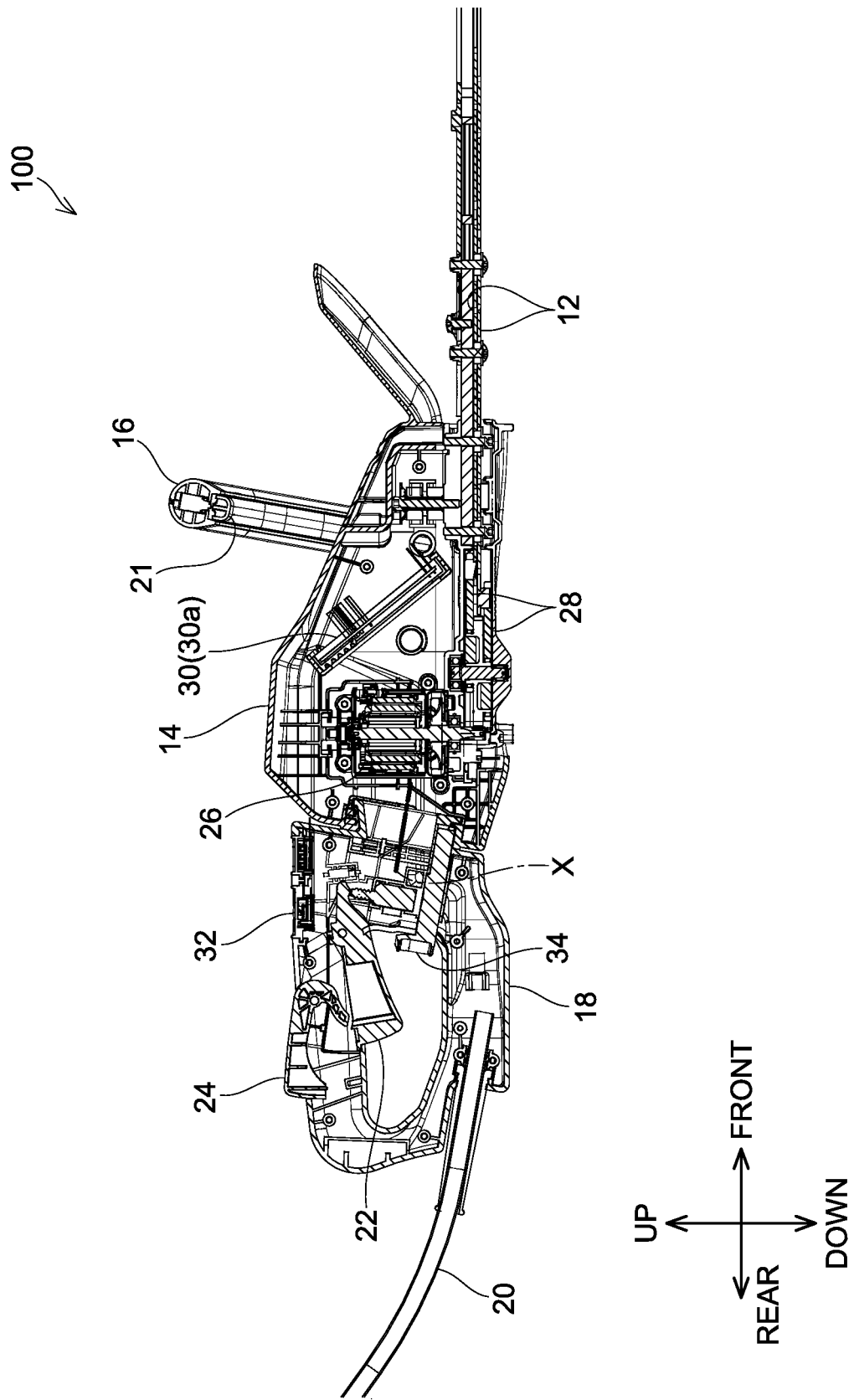
FIG. 2 is a cross-sectional right side view of an internal structure of the hedge trimmer 100 according to the first embodiment, where a rear handle 18 is locked to a housing 14.

As illustrated in FIG. 2, the front handle 16 and the rear handle 18 are each attached to the housing 14. The front handle 16 is positioned at an upper front portion of the housing 14. The rear handle 18 is positioned rearward of the housing 14. The rear handle 18 is attached to the housing 14 such that the rear handle 18 is rotatable about a rotation axis X with respect to the housing 14. The rotation axis X may be slightly inclined in the up-down direction to the front-rear direction. For example, the rotation axis X is inclined in the up-down direction to the front-rear direction in a range from −20 degrees to 45 degrees with a clockwise direction in the right side view as a positive direction. In the present embodiment, the rotation axis X is inclined by 10 degrees in the up-down direction to the front-rear direction, with the clockwise direction as the positive direction. In the following description, a direction forward along the rotation axis X may be referred to as the front direction and a direction rearward along the rotation axis X may be referred to as the rear direction, for the sake of convenience. The hedge trimmer 100 is a hand-held electric tool, and the user typically grasps the front handle 16 with one hand and grasps the rear handle 18 with the other hand to operate the hedge trimmer 100. The front handle 16 extends along a plane that is angled to the front-rear direction. In the state illustrated in FIGS. 1 and 2, the rear handle 18 extends along a plane that is parallel to the front-rear direction and the up-down direction (i.e., a plane perpendicular to the right-left direction).

A first drive switch 21 is disposed at the front handle 16, and a second drive switch 22 is disposed at the rear handle 18. Further, a lock switch 24 is disposed at the rear handle 18. The hedge trimmer 100 is configured to drive the pair of shear blades 12 only while both the first drive switch 21 and the second drive switch 22 are operated simultaneously. Further the second drive switch 22 is usually locked by the lock switch 24 mechanically, and operation on the second drive switch 22 is permitted only while the lock switch 24 is operated. The first drive switch 21, the second drive switch 22, and the lock switch 24 are each operated by the user grasping the front handle 16 and the rear handle 18. Thus, the hedge trimmer 100 is configured to prohibit driving the pair of shear blades 12 unless the user grasps both the front handle 16 and the rear handle 18.

The hedge trimmer 100 further comprises a motor 26 as an example of prime mover. The motor 26 is housed in the housing 14 and drives the pair of shear blades 12. In this regard, the motor 26 is connected to the pair of shear blades 12 via crank cams 28 and is configured to reciprocate each of the pair of shear blades 12. The motor 26 in the present embodiment is a brushless motor. The rotation axis of the motor 26 is perpendicular to the longitudinal direction of the pair of shear blades 12 and extends in the up-down direction.

The hedge trimmer 100 further comprises an electric circuit unit 30 housed within the upper front portion of the housing 14. The electric circuit unit 30 is electrically connected to the power cable 20, adjusts electric power supplied from an external through the power cable 20, and supplies it to the motor 26. When the user operates the first drive switch 21 and the second drive switch 22, the electric circuit unit 30 starts supplying electric power to the motor 26, whereas when the operation on the first drive switch 21 or the second drive switch 22 is released, the electric circuit unit 30 stops the electric power supply to the motor 26. Thus, the electric circuit unit 30 can switch the motor 26 between ON and OFF. Further, the electric circuit unit 30 can switch the main power of the hedge trimmer 100 between ON and OFF, change the rotational speed of the motor 26, drive the motor 26 reversely, etc. according to the state of operation buttons 32 operated by the user. In the present embodiment, the electric circuit unit 30 further comprises an inverter circuit 30a since the motor 26 is a brushless motor. The inverter circuit 30a is electrically disposed between the power cable 20 and the motor 26, converts DC power from the power cable 20 to AC power, and supplies it to the motor 26.

(Configuration of Projection 182)

Figure 3:
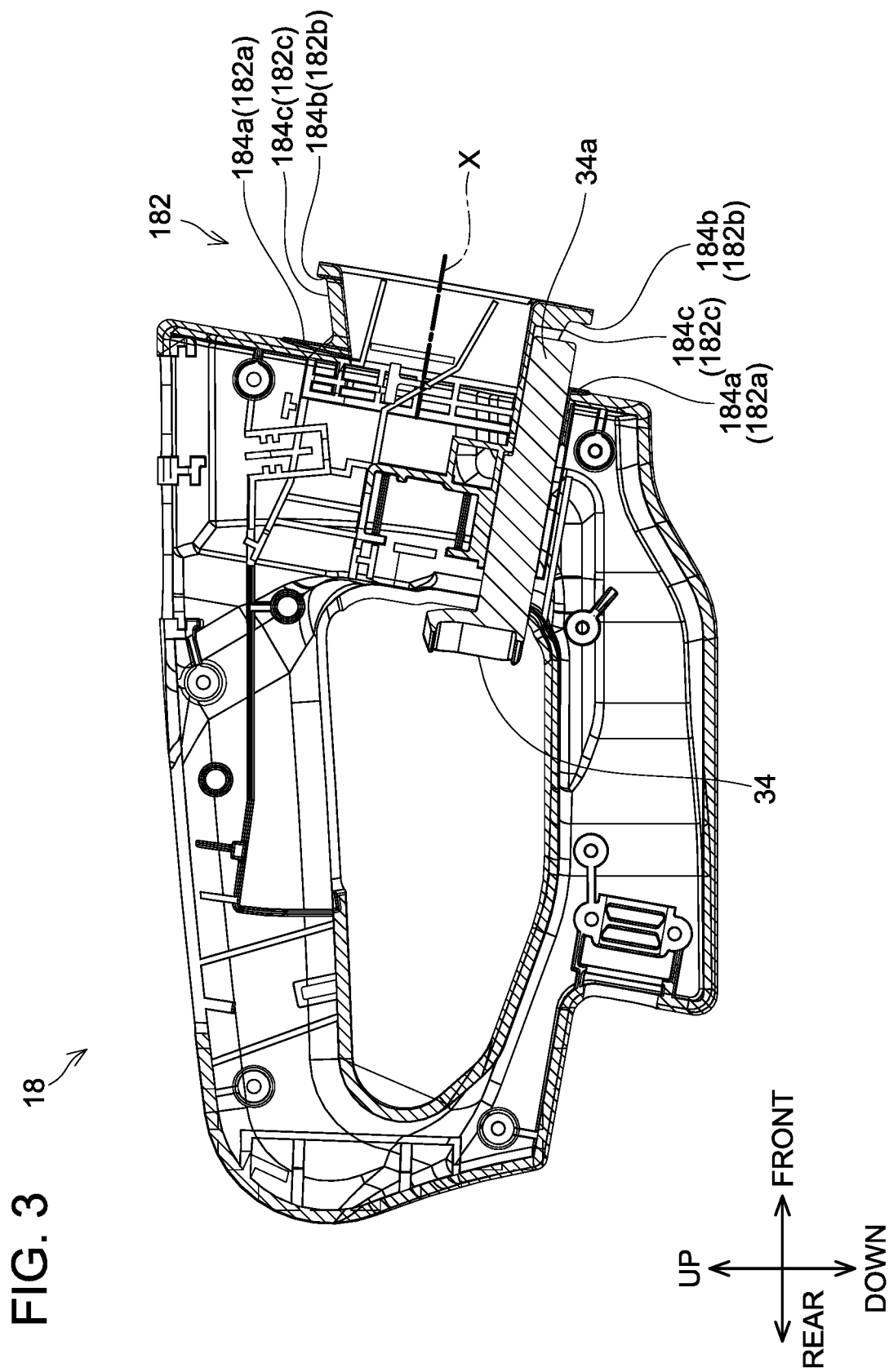
FIG. 3 is a cross-sectional right side view of the rear handle 18 of the hedge trimmer 100 according to the first embodiment.

As illustrated in FIG. 3, the rear handle 18 comprises a projection 182 projecting forward. The projection 182 comprises a shaft portion 182c, a base 182a, and a flange 182b. An outer surface 184c of the shaft portion 182c has a shape of circular truncated cone. The outer surface 184c of the shaft portion 182c increases in diameter in the front direction (second direction) along the rotation axis X, in other words, decreases in diameter in the rear direction (first direction) along the rotation axis X. The base 182a has a shape of wide annular flat plate and extends from a rear end of the shaft portion 182c in a radially outward direction of the rotation axis X. A front surface of the base 182a is a facing surface 184a. The flange 182b has a shape of wide annular flat plate and extends from a front end of the shaft portion 182c in the radially outward direction of the rotation axis X. A rear surface of the flange 182b is a facing surface 184b. In the present embodiment, the facing surface 184a and the facing surface 184b are perpendicular to the rotation axis X.

Figure 4:
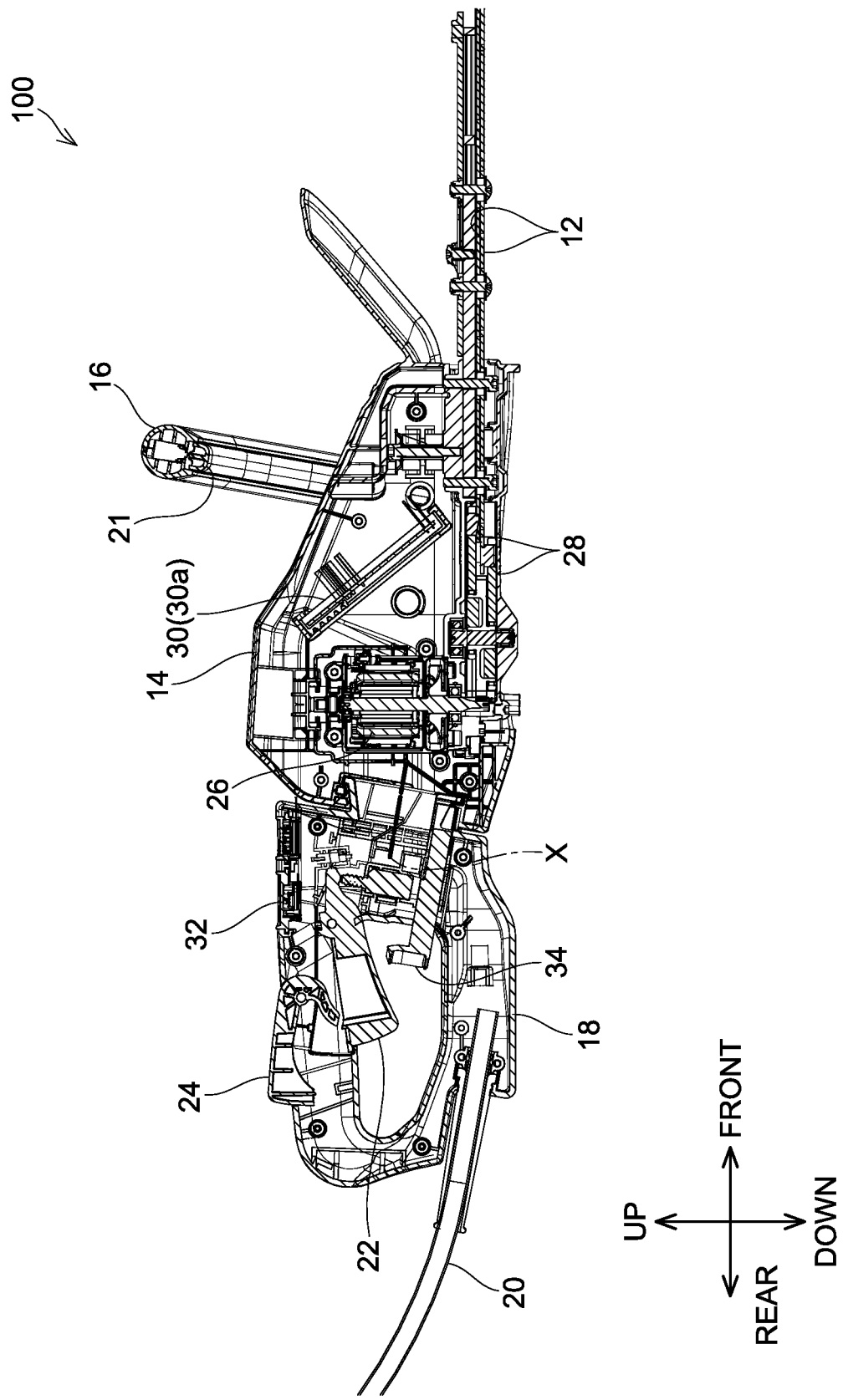
FIG. 4 is a cross-sectional right side view of the internal structure of the hedge trimmer 100 according to the first embodiment, where the rear handle 18 is not locked to the housing 14.
Figure 5:
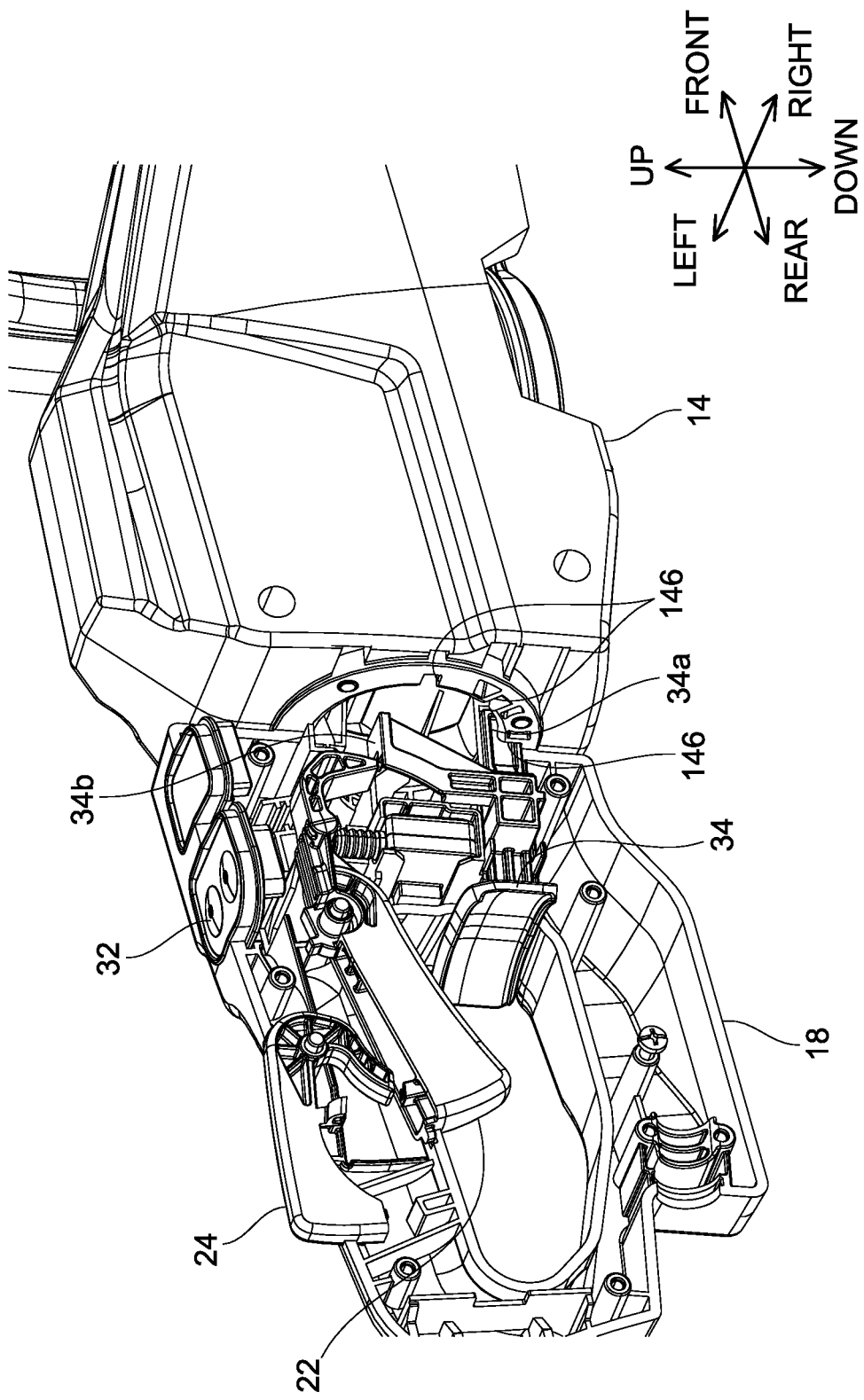
FIG. 5 is a perspective view of the internal structure of the hedge trimmer 100 according to the first embodiment as viewed from the upper rear right side, where a lock member 34 is at an advance position.
Figure 6:
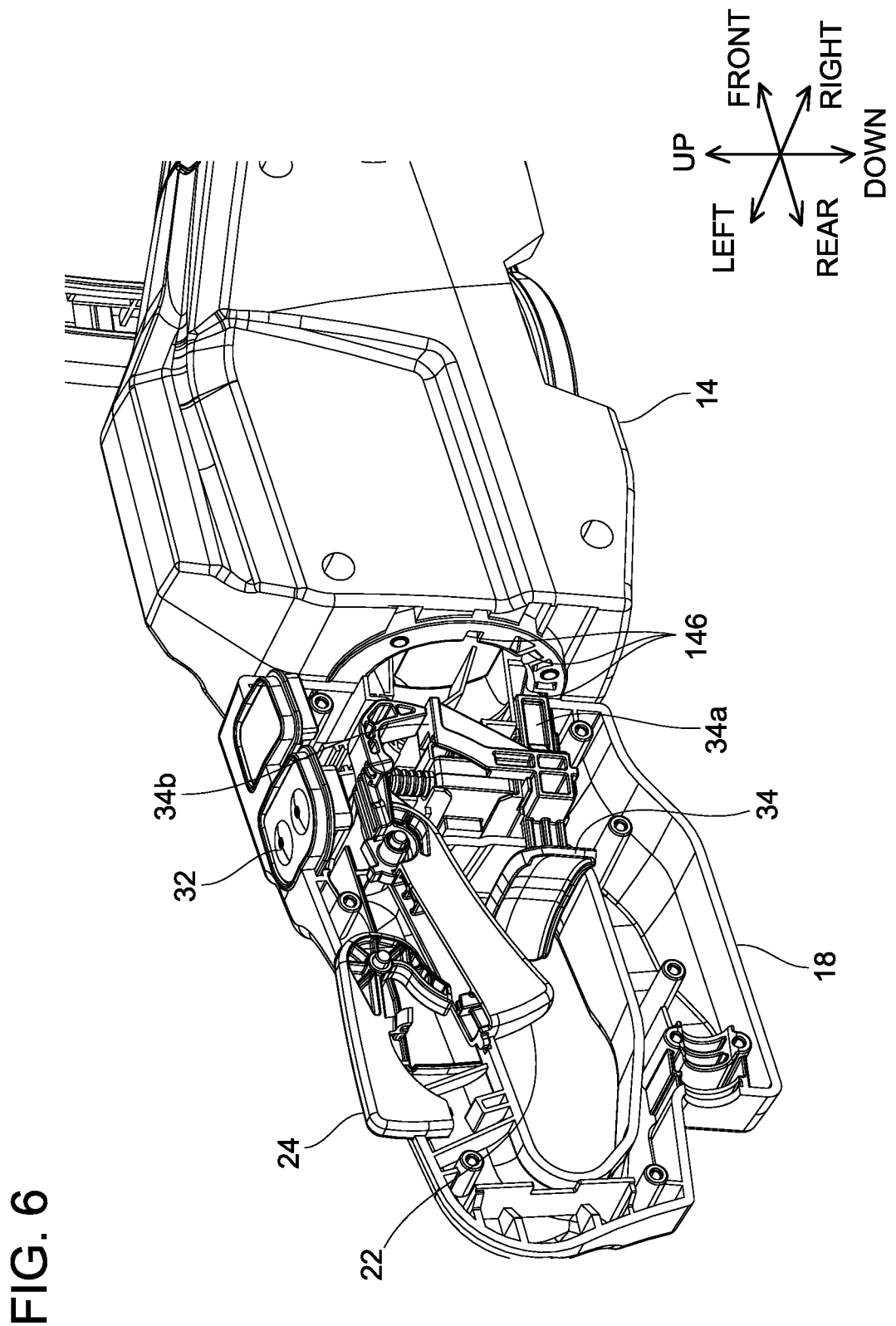
FIG. 6 is a perspective view of the internal structure of the hedge trimmer 100 according to the first embodiment as viewed from the upper rear right side, where the lock member 34 is at a retracted position.

The rear handle 18 further comprises a lock member 34. The lock member 34 is retained such that it is slidable with respect to the rear handle 18 substantially in the front-rear direction. The lock member 34 may be slightly inclined in the up-down direction to the front-rear direction, for example, may be inclined to the front-rear direction by substantially the same angle as the inclination angle of the rotation axis X to the front-rear direction. In the present embodiment, the lock member 34 is inclined in the up-down direction to the front-rear direction by 10 degrees with the clockwise direction in the right view as the positive direction. The lock member 34 is biased forward with respect to the rear handle 18 by a coil spring (not illustrated) housed in the rear handle 18. Thus, when the user does not operate the lock member 34 as illustrated in FIG. 2, the lock member 34 is at an advance position where the lock member 34 projects from the rear handle 18 toward the housing 14 by the biasing force of the coil spring. When the user pulls the lock member 34 against the biasing force of the coil spring as illustrated in FIG. 4, the lock member 34 is moved to a retracted position where the lock member 34 is retracted to the inside of the rear handle 18 from the housing 14. As illustrated in FIG. 5, the lock member 34 comprises an engaging projection 34a projecting in the front direction and a stopper 34b arranged corresponding to the second drive switch 22. When the lock member 34 is at the advance position, the second drive switch 22 and the stopper 34b of the lock member 34 do not mechanically interfere with each other, and thus the operation on the second drive switch 22 is permitted. When the lock member 34 is at the retracted position as illustrated in FIG. 6, the second drive switch 22 and the stopper 34b of the lock member 34 mechanically interfere with each other, and thus the operation on the second drive switch 22 is prohibited.

(Configuration of Coupling Portion 142)

Figure 8A:
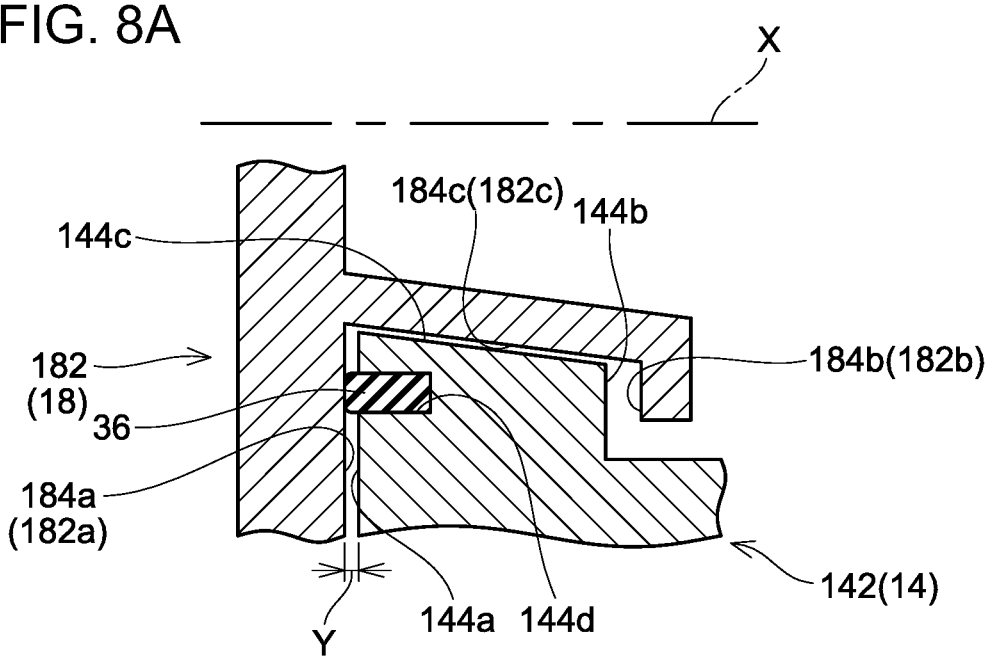
FIG. 8A and FIG. 8B are diagrams schematically illustrating positional relationships between a coupling portion 142, a projection 182, and a rubber pin 36 when the housing 14 is coupled to the rear handle 18 in the hedge trimmer 100 according to the first embodiment.
Figure 8B:
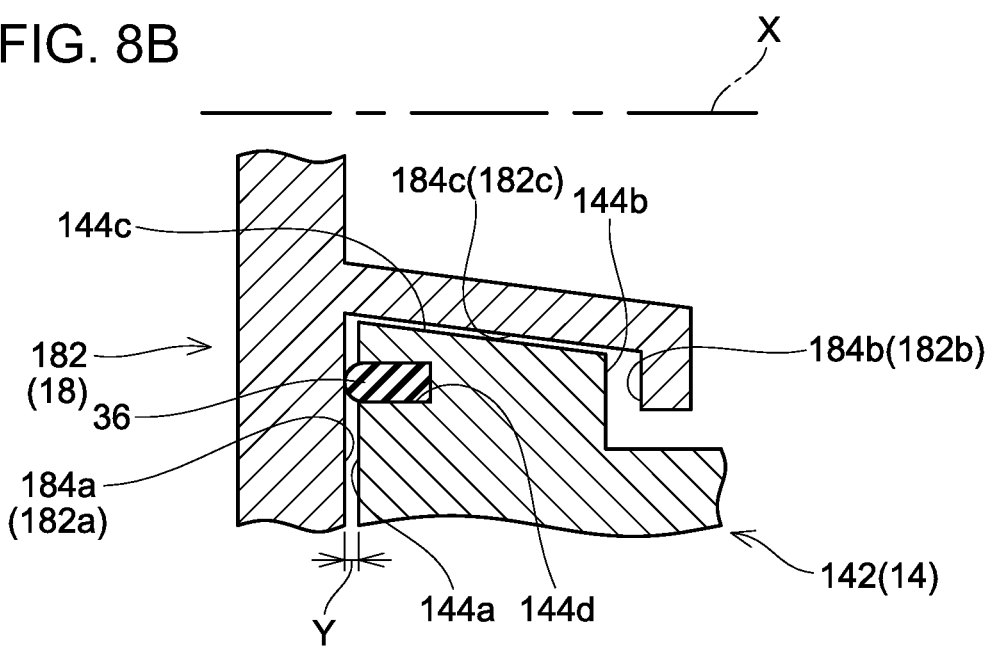

As illustrated in FIG. 7, the housing 14 comprises a coupling portion 142 configured to be coupled to the projection 182 of the rear handle 18. The coupling portion 142 comprises a facing surface 144a and a facing surface 144b. In the state where the housing 14 is coupled to the rear handle 18 as illustrated in FIG. 8A and FIG. 8B, the facing surface 144a faces the facing surface 184a in the direction of the rotation axis X with a first interval Y therebetween. The first interval Y may be equal to or less than 1 mm. In the present embodiment, the first interval Y is 0.8 mm. In the state where the housing 14 is coupled to the rear handle 18, the facing surface 144b faces the facing, surface 184b in the direction of the rotation axis X with an interval therebetween. The coupling portion 142 further comprises an engaging surface 144c configured to engage with the shaft portion 182c. The engaging surface 144c has a similar shape to that of the outer surface 184c of the shaft portion 182c. That is, the engaging surface 144c has a shape of circular truncated cone. The engaging surface 144c increases in diameter in the front direction (second direction) and decreases in diameter in the rear direction (first direction). When the rear handle 18 is moved in the first direction with respect to the housing 14, the outer surface 184c of the shaft portion 182c contacts the engaging surface 144c, thereby suppressing the movement of the rear handle 18 in the first direction with respect to the housing 14. That is, the outer surface 184c and the engaging surface 144c are engaged with each other in the first direction. When the rear handle 18 is moved in a direction perpendicular to the rotation axis X with respect to the housing 14, the outer surface 184c of the shaft portion 182c contacts the engaging surface 144c, thereby suppressing the movement of the rear handle 18 in the direction perpendicular to the rotation axis X with respect to the housing 14. That is, the outer surface 184c and the engaging surface 144c are engaged with each other also in the direction perpendicular to the rotation axis X.

As illustrated in FIG. 9, the coupling portion 142 comprises receiving holes 146 into which the engaging projection 34a of the lock member 34 (see FIGS. 5 and 6) is inserted in the front direction. The receiving holes 146 are defined in the facing surface 144a. The receiving holes 146 each have a shape that engages with the engaging projection 34a, and thus when the engaging projection 34a is inserted in one of the receiving holes 146, the lock member 34 is fixed with respect to the housing 14 in the circumferential direction of the rotation axis X. When the lock member 34 is at the advance position as illustrated in FIG. 5, the engaging projection 34a is inserted in one of the receiving holes 146, thereby prohibiting rotation of the rear handle 18 with respect to the housing 14. When the lock member 34 is at the retracted position as illustrated in FIG. 6, the engaging projection 34a is retracted to the inside of the rear handle 18 and does not interfere with the housing 14, thereby permitting the rotation of the rear handle 18 with respect to the housing 14.

Figure 10:
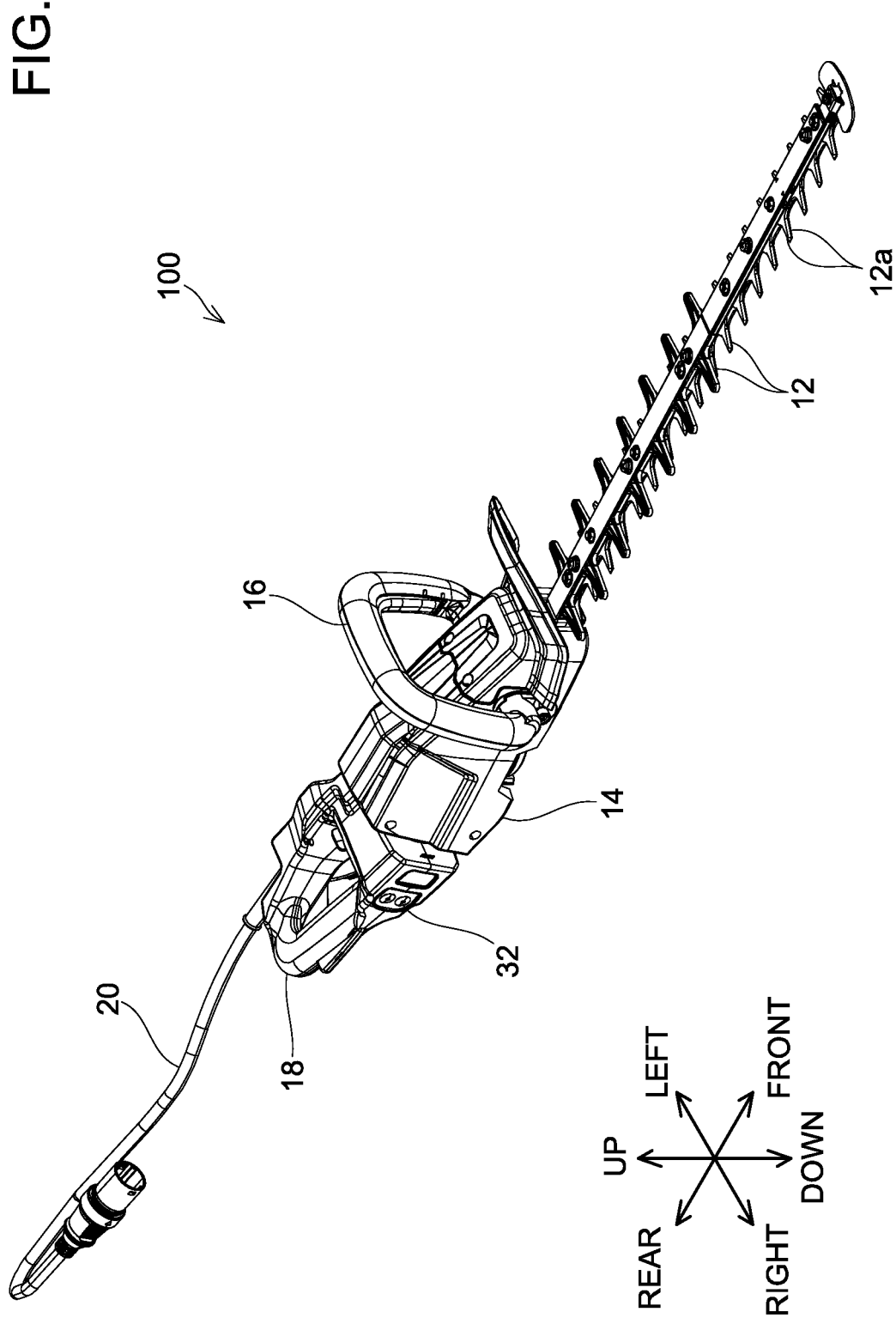
FIG. 10 is a perspective view of the hedge trimmer 100 according to the first embodiment as viewed from tire upper front right side, where the rear handle 18 is rotated to the right by 90 degrees with respect to the housing 14.

As illustrated in FIG. 10, the rear handle 18 can be rotated with respect to the housing 14. FIG. 10 illustrates a state where the rear handle 18 is rotated to the right by 90 degrees with respect to the housing 14. The user can change the rotation angle of the rear handle 18 with respect to the housing 14 accordingly. The lock member 34 can be fixed at plural positions since the plurality of receiving holes 146 is defined in the coupling portion 142. Thus, the rear handle 18 can be fixed at plural rotation angles with respect to the housing 14. This improves the operability of the hedge trimmer 100.

Figure 11:
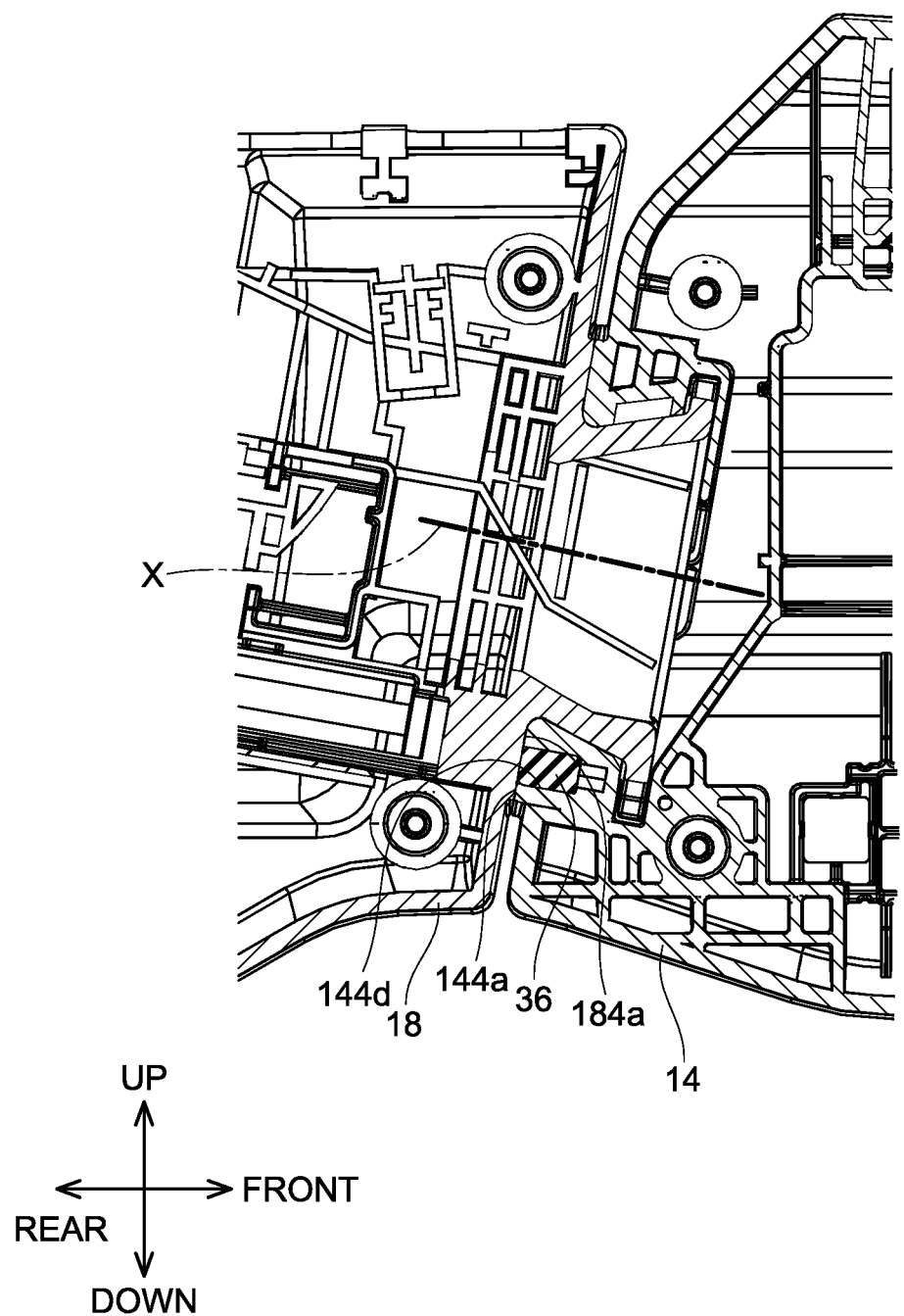
FIG. 11 is a cross-sectional right side view of the coupling portion 142 and the projection 182 when the housing 14 is coupled to the rear handle 18 in the hedge trimmer 100 according to the first embodiment.

As illustrated in FIG. 9, a plurality of housing grooves 144d is defined in the facing surface 144a. Elastic members (which are a plurality of rubber pins 36 in the present embodiment) are housed in the housing grooves 144d, respectively. In the present embodiment, four rubber pins 36 are arranged on the circumference of a circle having its center on the rotation axis X. Specifically, a rubber pin 36a is arranged at an upper right portion of the facing surface 144a, a rubber pin 36b is arranged at a lower right portion of the facing surface 144a, a rubber pin 36c is arranged at a lower left portion of the facing surface 144a, and a rubber pin 36d is arranged at an upper left portion of the facing surface 144a. In other words, in four quadrants defined by a plane extending in the up-down direction and a plane extending in the right-left direction that include the rotation axis X, at least one rubber pin 36 is arranged in each of the quadrants. As illustrated in FIG. 8A and FIG. 11, the rubber pins 36 each have an approximately cylindrical shape. An axial direction of each cylindrical shape is along the rotation axis X. A rear end portion of each rubber pin 36 projects rearward from the facing surface 144a. The rear cod portions of tire rubber pins 36 are rounded. As illustrated in FIG. 8B, the rear end portions of the lubber pins 36 may be approximately hemispherical. In the state where the housing 14 is coupled to the rear handle 18, the rear end portions of the rubber pins 36 contact the facing surface 184a. When the rear handle 18 is moved in the front direction (second direction) with respect to the housing 14, the movement of the rear handle 18 in the front direction (second direction) with respect to the housing 14 is suppressed by elastic resilience of the rubber pins 36.

Figure 12:
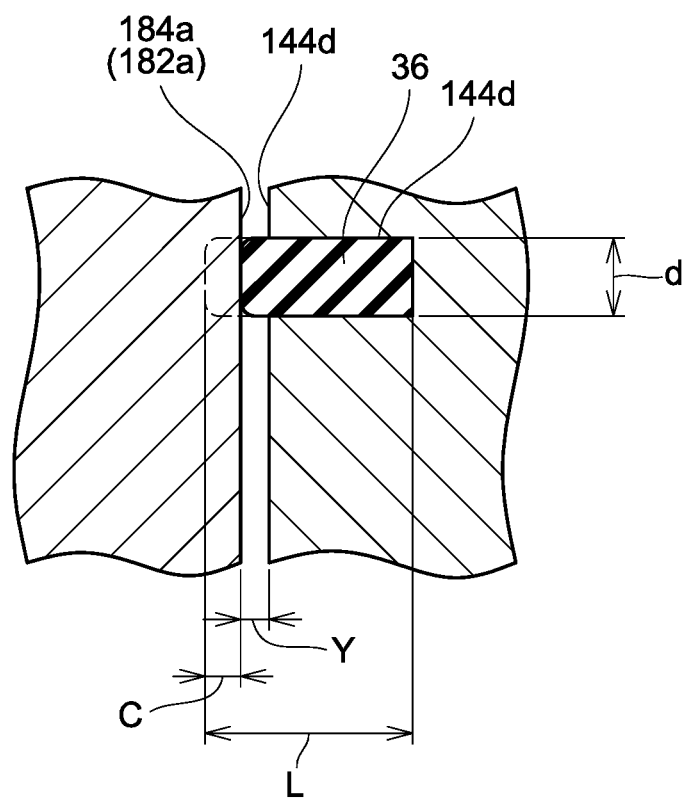
FIG. 12 is a diagram schematically illustrating a state of the rubber pin 36 when the housing 14 is coupled to the rear handle 18 in the hedge trimmer 100 according to the first embodiment.

In the state where the housing 14 is coupled to the rear handle 18 as illustrated in FIG. 12, each rubber pin 36 is compressed in the direction of the rotation axis X by a squeezing margin C front its natural state. If the squeezing margin C of tire rubber pins 36 does not exist, backlash between the rear handle 18 and the housing 14 may not be reduced sufficiently. A relational expression L/7>Y holds between the first interval Y in the state where the housing 14 is coupled to the rear handle 18 and a natural length L of the rubber pins 36. Further, a relational expression d/5>Y holds between the first interval Y and a diameter d of the rubber pins 36. If the above relations do not hold between the natural length L, the diameter d, and the first interval Y, the elastic resilience due to elastic deformation of the rubber pins 36 becomes excessive and thus sliding friction caused when the rear handle 18 is rotated with respect to the housing 14 may not be reduced. The natural length L of the rubber pins 36 may range from 10.8 mm to 7.2 mm. In the present embodiment, the natural length L is 9 mm. The squeezing margin C may range from 1.0 mm to 0.2 mm. In the present embodiment, the squeezing margin C is 0.6 mm. The diameter d of the rubber pins 36 may range from 6.4 mm to 5.2 mm. In the present embodiment, the diameter d is 5.8 mm.

When the rear handle 18 is rotated with respect, to the housing 14, the rubber pins 36 slide on the facing surface 184a while contacting the facing surface 184a. Since the rubber pins 36 are discretely arranged in the circumferential direction of the rotation axis X as illustrated in FIG. 9, sliding friction caused when the rear handle 18 is rotated with respect to the housing 14 is reduced. Further, since the rear end portions of the rubber pins 36 are rounded, uneven contact of the rubber pins 36 with the facing surface 184a can be prevented when the rear handle 18 is rotated with respect to the housing 14.

As illustrated in FIG. 11, the shaft portion 182c has a hollow center along the direction of the rotation axis X, and the inside of the housing 14 is spatially connected to the inside of the rear handle 18. By disposing an electric wire (not illustrated), etc. in the hollow of the shaft portion 182c accordingly, the electric circuit unit 30 housed in the upper front portion of the housing 14 can be electrically connected to the power cubic 20 positioned at a rear portion of the rear handle 18.

(Variants)

In the embodiment above, the hedge trimmer 100 is described as an example of working machine. Unlike this, the working machine may be a working machine other than the hedge trimmer 100. For example, the working machine may be a chain saw, a grass cutter, or the like.

In the embodiment above, the pair of shear blades 12 is supported by the housing 14. Unlike this, the hedge trimmer 100 may further comprise a support rod (not illustrated), and the housing 14 may be supported by a rear end of the support rod, a front housing may be supported by a front end of the support rod, and the pair of shear blades 12 may be supported by the front housing.

In the embodiment above, each of the pair of shear blades 12 is configured to reciprocate. Unlike this, only one of the pair of shear blades 12 may be configured to reciprocate.

In the embodiment above, the motor 26 is described as an example of prime mover. Unlike this, the prime mover may be a prime mover other than the motor 26. For example, the prime mover may be an engine.

In the embodiment above, the working machine (the hedge trimmer 100) comprises the power cable 20 and electric power is supplied to the hedge trimmer 100 from an external through the power cable 20. Unlike this, the working machine (the hedge trimmer 100) may comprise a battery pack (not illustrated) configured to be detachably attached to the rear handle 18 and electric power may be supplied to the working machine (the hedge trimmer 100) from the battery pack.

In the embodiment above, the prime mover (the motor 26) is a brushless motor. Unlike this, the prime mover (the motor 26) may be a motor other than the brushless motor. For example, the prime mover (the motor 26) may be a brushed motor or the like.

In the embodiment above, the rotation axis X is slightly inclined to the front-rear direction. Unlike this, the rotation axis X may be parallel to the front-rear direction.

In the embodiment above, the number of elastic members (the rubber pins 36) disposed at the coupling portion 142 is four. Unlike this, the number of elastic members (the rubber pins 36) disposed at the coupling portion 142 is not limited to four and may be any number.

In the embodiment above, the elastic members (the rubber pins 36) each have an approximately cylindrical shape. Unlike this, the elastic members (the rubber pins 36) may each have a shape other than the approximately cylindrical shape. For example, the elastic members (the rubber pins 36) may each have a spherical shape.

In the embodiment above, the elastic members (the rubber pins 36) are separate components. Unlike this, the elastic members (the rubber pins 36) may be configured as an integrated component in which the elastic members (the rubber pins 36) are coupled to an O-ring shaped elastic member (not illustrated) at their front ends. In this case as well, the rear end portions of the elastic members (the rubber pins 36) comprise a plurality of contact portions configured to contact the facing surface 184a.

In the embodiment above, the housing 14 comprises the coupling portion 142 and the rear handle 18 comprises the projection 182. Unlike this, the housing 14 may comprise the projection 182 and the rear handle 18 may comprise the coupling portion 142.

Figure 13:
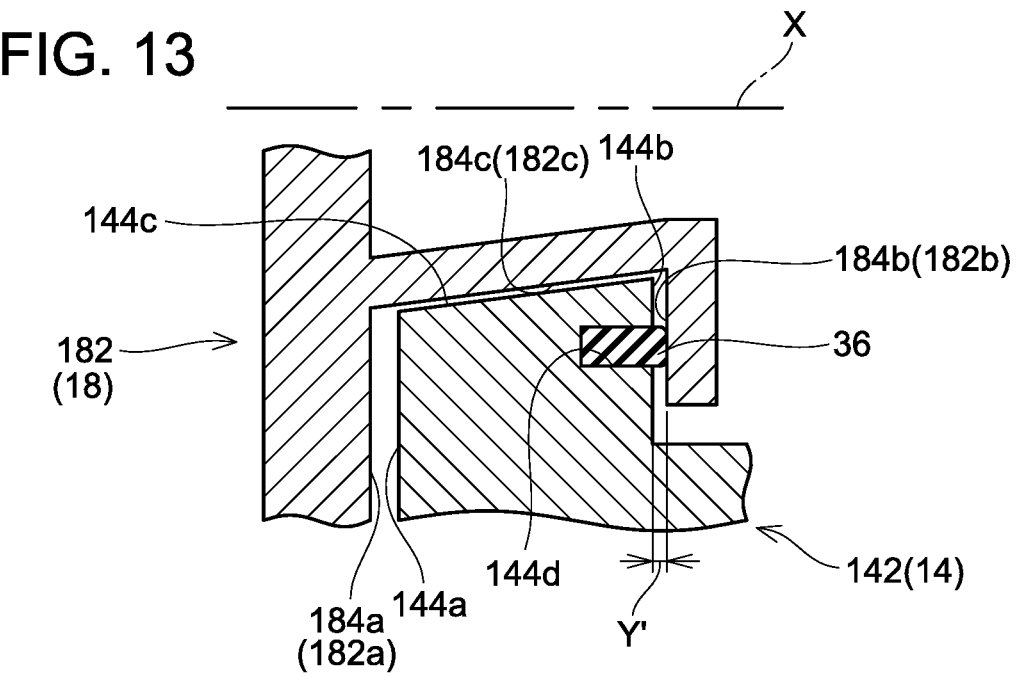
FIG. 13 is a diagram schematically illustrating a positional relationship between a coupling portion 142, a projection 182, and a rubber pin 36 when a housing 14 is coupled to a rear handle 18 in a hedge trimmer 100 according to a variant.

In the embodiment above, the outer surface 184c of the shaft portion 182c decreases in diameter in the rear direction, the facing surface 144a is arranged to face the facing surface 184a with the first interval Y therebetween in the direction of the rotation axis X, the rear end portions of the elastic members (the rubber pins 36) project rearward from the facing surface 144a of the housing 14, and the rear end portions of the elastic members (the rubber pin 36) contact the facing surface 184a in the state where the housing 14 is coupled to the rear handle 18. Unlike this, as illustrated in FIG. 13, the outer surface 184c of the shaft portion 182c may decrease in diameter in the front direction (first direction), the facing surface 144b may be arranged to face the facing surface 184b with a second interval Y' therebetween in the direction of the rotation axis X, and front end portions of the elastic members (the rubber pins 36) may project forward from the facing surface 144b of the housing 14 and contact the facing surface 184b in the state where the housing 14 is coupled to the rear handle 18. The second interval Y' may be equal to or less than 1 mm. In the present variant, the second interval Y' may be 0.8 mm.

Figure 14:
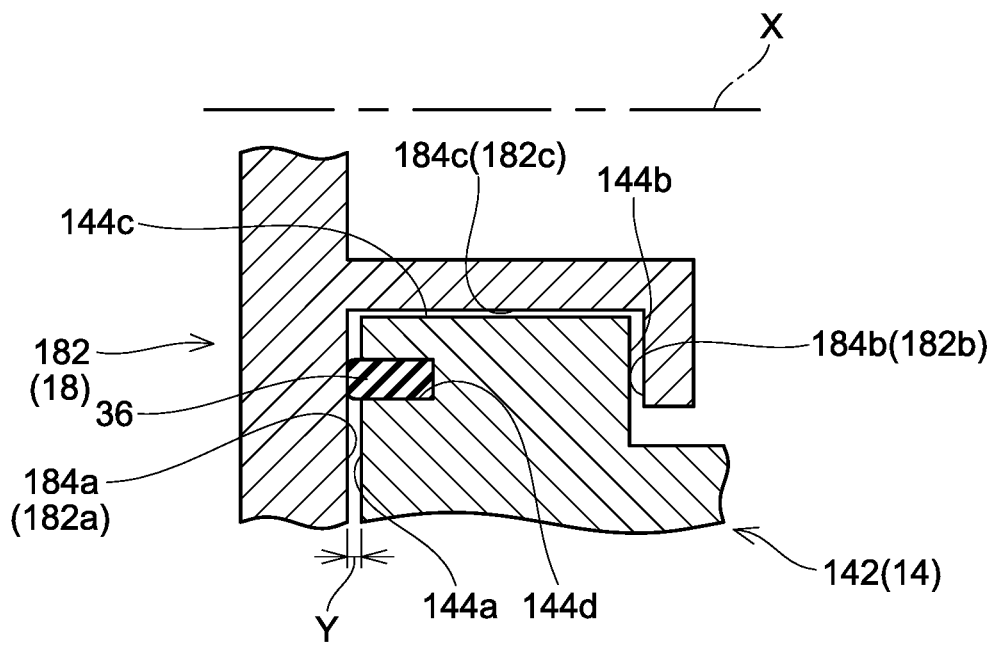
FIG. 14 is a diagram schematically illustrating another positional relationship between a coupling portion 142, a projection 182, and a rubber pin 36 when a housing 14 is coupled to a rear handle 18 in a hedge trimmer 100 according to a variant.

In the embodiment above, the outer surface 184c of the shaft portion 182c decreases in diameter in one direction along the direction of the rotation axis X. Unlike this, as illustrated in FIG. 14, the outer surface 184c of the shaft portion 182c may be constant in diameter along the direction of the rotation axis X.

Figure 15:
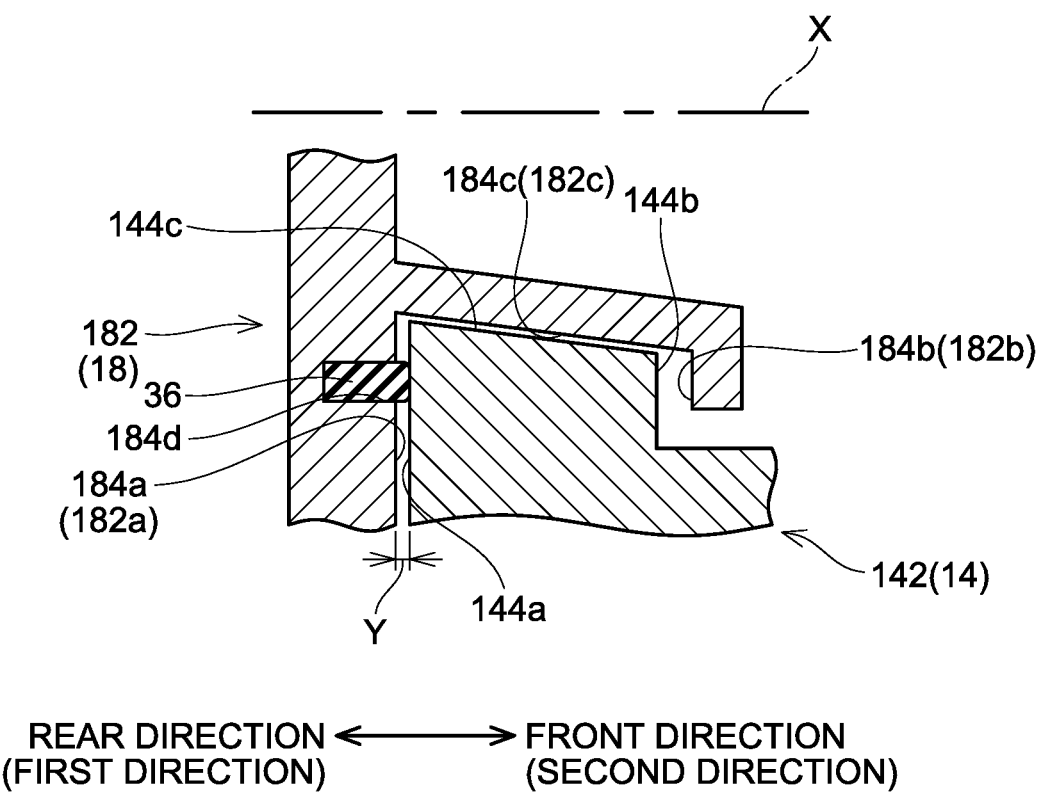
FIG. 15 is a diagram schematically illustrating yet another positional relationship between a coupling portion 142, a projection 182, and a rubber pin 36 when a housing 14 is coupled to a rear handle 18 in a hedge trimmer 100 according to a variant.

In the embodiment above, the elastic members (the rubber pins 36) are housed in the housing grooves 144d defined in the housing 14. Unlike this, as illustrated in FIG. 15, the elastic members (the rubber pins 36) may be housed in housing grooves 184d defined in the rear handle 18.

Figure 16:
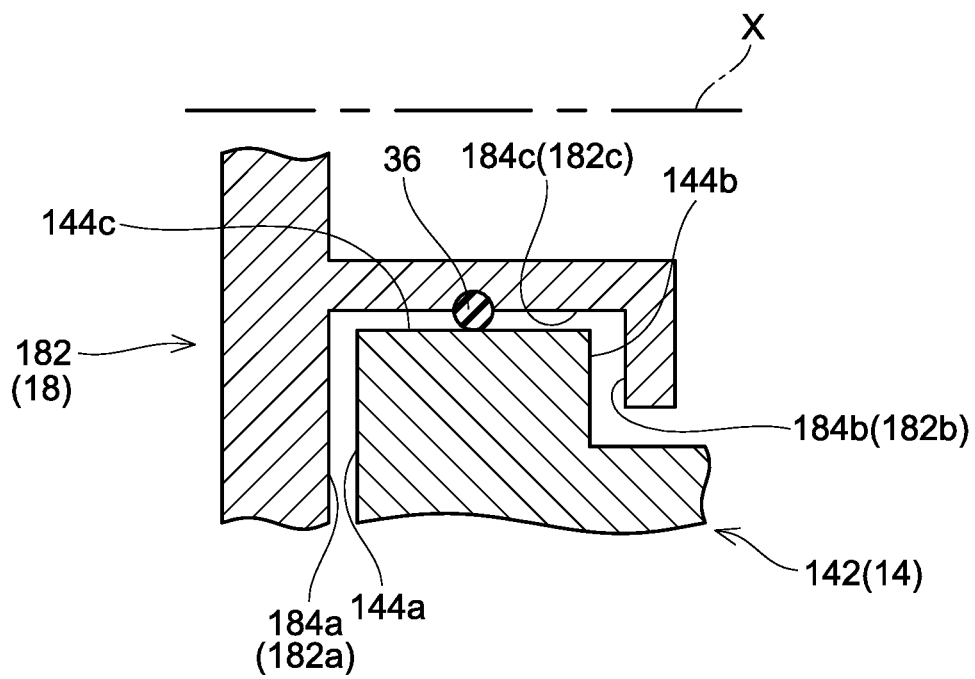
FIG. 16 is a diagram schematically illustrating still another positional relationship between a coupling portion 142, a projection 182, and a rubber pin 36 when a housing 14 is coupled to a rear handle 18 in a hedge trimmer 100 according to a variant.

In the embodiment above, the elastic members (the rubber pins 36) are arranged between the facing surface 144a (or the facing surface 144b) and the facing surface 184a (or the facing surface 184b) which face each other with an interval therebetween in the direction of the rotation axis X. Unlike this, as illustrated in FIG. 16, the elastic members (the rubber pins 36) may be arranged between the engaging surface 144c and the outer surface 184c which face each other with an interval therebetween in the direction perpendicular to the rotation axis X. The elastic members (the rubber pins 36) may be arranged discretely in the circumferential direction of the rotation axis X. If an elastic member including a continuous contact portion in the circumference direction of the rotation axis X, such as an O-ring (not illustrated), is used, sliding friction caused when the rear handle 18 is rotated with respect to the housing 14 is increased. In the configuration illustrated in FIG. 16, the elastic members (the rubber pins 36) are arranged discretely in the circumferential direction of the rotation axis X, and thus sliding friction caused when the rear handle 18 is rotated with respect to the housing 14 can be reduced.

In the embodiment above, the facing surface 144a, the facing surface 144b, the facing surface 184a, and the facing surface 184b are perpendicular to the rotation axis X. Unlike this, the facing surface 144a, the facing surface 144b, the facing surface 184a, and the facing surface 184b may not be perpendicular to the rotation axis X.

(Correspondence Relationships)

As described, in one or more embodiments, the hedge trimmer 100 (an example of working machine) comprises: the pair of shear blades 12 (an example of working part); the motor 26 (an example of prime mover) configured to drive the pair of shear blades 12; the housing 14 supporting the pair of shear blades 12; the rear handle 18 attached to the housing 14 such that the rear handle 18 is rotatable about the rotation axis X with respect to the housing 14 and configured to be grasped by a user; and the rubber pins 36 (an example of elastic member) arranged between the housing 14 and the rear handle 18. The housing 14 comprises the facing surface 144a (or the facing surface 144b) (an example of first surface). The rear handle 18 comprises the facing surface 184a (or the facing surface 184b) (an example of second surface) that faces the facing surface 144a (or the facing surface 144b) in the direction of the rotation axis X with an interval therebetween. The rubber pins 36 are arranged between the facing surface 144a (or the facing surface 144b) and the facing surface 184a (or the facing surface 184b).

According to the configuration above, backlash between the rear handle 18 and the housing 14 can be reduced by the rubber pins 36 arranged between the facing surface 144a (or the facing surface 144b) and the facing surface 184a (or the facing surface 184b). In the hedge trimmer 100 in which the rear handle 18 is attached to the housing 14 such that the rear handle 18 is rotatable with respect to the housing 14, backlash between the rear handle 18 and the housing 14 can be reduced. Further, according to the configuration above, the rubber pins 36 are arranged between the facing surface 144a (or the facing surface 144b) and the facing surface 184a (or the facing surface 184b), which are arranged in the direction of the rotation axis X with an interval therebetween, and thus backlash between the rear handle 18 and the housing 14 in the direction of the rotation axis X can be reduced.

In one or more embodiments, one of the housing 14 and the rear handle 18 comprises the shaft portion 182c that includes the outer surface 184c decreasing in diameter in the first direction (the rear direction or the front direction) along the rotation axis X. The other of the housing 14 and the rear handle 18 comprises the engaging surface 144c (an example of engaging portion) configured to engage the outer surface 184c of the shaft portion 182c in the first direction (the rear direction or the front direction). The facing surface 144a (or the facing surface 144b) and the facing surface 184a (or the facing surface 184b) are offset to the engaging surface 144c in the first direction (the rear direction or the front direction) with respect to the direction of the rotation axis X.

According to the configuration above, engagement of the engaging surface 144c with the outer surface 184c of the shaft portion 182c suppresses one of the housing 14 and the rear handle 18 from moving in the first direction (the rear direction or the front direction) with respect to the other of the housing 14 and the rear handle 18, and the rubber pins 36 suppress the one of the housing 14 and the rear handle 18 from moving in the opposite direction to the first direction (the rear direction or the front direction) with respect to the other of the housing 14 and the rear handle 18. Further, the engagement of the engaging surface 144c with the outer surface 184c of the shaft portion 182c suppresses the one of the housing 14 and the rear handle 18 from moving in the direction perpendicular to the rotation axis X with respect to the other of the housing 14 and the rear handle 18. This configuration can effectively reduce backlash between the rear handle 18 and the housing 14.

In one or more embodiments, the rubber pins 36 (the rubber pins 36a, 36b, 36c, 36d) comprise the rear end portions (or the front end portions) (an example of the plurality of contact portions) of the rubber pins 36a, 36b, 36c, 36d that are discretely arranged in the circumferential direction of the rotation axis X and configured to contact the facing surface 144a (or the facing surface 144b) or the facing surface 184a (or the facing surface 184b).

According to the configuration above, sliding friction caused when the rear handle 18 is rotated with respect to the housing 14 can be reduced. This facilitates the rotation of the rear handle 18 for the user.

In one or more embodiments, the hedge trimmer 100 comprises the pair of shear blades 12; the motor 26 configured to drive the pair of shear blades 12; the housing 14 supporting the pair of shear blades 12; the rear handle 18 attached to the housing 14 such that the rear handle 18 is rotatable about the rotation axis X with respect to the housing 14 and configured to be grasped by the user; and the rubber pins 36 arranged between the housing 14 and the rear handle 18. The housing 14 comprises the facing surface 144a (or the facing surface 144b, the engaging surface 144c) (an example of first surface). The rear handle 18 comprises the facing surface 184a (or the facing surface 184b, the outer surface 184c) (an example of second surface) that faces the facing surface 144a (or the facing surface 144b, the engaging surface 144c) with an interval therebetween. The rubber pins 36 are arranged between the facing surface 144a (or the facing surface 144b, the engaging surface 144c) and the facing surface 184a (or the facing surface 184b, the outer surface 184c). The rubber pins 36 comprise the rear end portions (or the front end portions) of the rubber pins 36a, 36b, 36c, 36d that are discretely arranged in the circumferential direction of the rotation axis X and configured to contact the facing surface 144a (or the facing surface 144b, the engaging surface 144c) or the facing surface 144a (or the facing surface 184b, the outer surface 184c).

According to the configuration above, backlash between the rear handle 18 and the housing 14 can be reduced by the rubber pins 36 arranged between the facing surface 144a (or the facing surface 144b, the engaging surface 144c) and the facing surface 184a (or the facing surface 184b, the outer surface 184c). In the hedge trimmer 100 in which tire rear handle 18 is attached to the housing 14 such that the rear handle 18 is rotatable with respect to the housing 14, backlash between tire rear handle 18 and the housing 14 can be reduced. Further, according to the configuration above, sliding friction caused when the rear handle 18 is rotated with respect to the housing 14 can be reduced. This facilitates the rotation of the rear handle 18 for the user.

In one or more embodiments, the rotation axis X is arranged inside a convex polygon that has centers of the rear end portions (or the front end portions) of the rubber pins 36a, 36b, 36c, 36d as vertexes, as viewed in the direction of the rotation axis X.

According to the configuration above, the rear end portions (or the front end portions) of the rubber pins 36a, 36b, 36c, 36d are arranged to surround the rotation axis X, and thus backlash between the rear handle 18 and the housing 14 can be effectively reduced.

In one or more embodiments, each of the rear end portions (the front end portions) of the rubber pins 36a, 36b, 36c, 36d is rounded (an example of comprising a rounded contact surface).

If one or more of the rear end portions (or the front end portions) of the rubber pins 36a, 36b, 36c, 36d are flat (an example of comprising a flat contact surface), the(se) rear end portion(s) (or front end portions)) may unevenly contact the facing surface 144a (or the facing surface 144b) or the facing surface 184a (or the facing surface 184b) when the rear handle 18 is rotated with respect to the housing 14, which may result in increased sliding friction. According to the configuration above, each of the rubber pins 36a, 36b, 36c, 36d is rounded, and thus sliding friction caused when the rear handle 18 is rotated with respect to the housing 14 can be reduced. This improves user's comfort.

In one or more embodiments, the rubber pins 36 comprise the rubber pins 36a, 36b, 36c, 36d (an example of the plurality of elastic cylindrical members) each having an approximately cylindrical shape, and the axial direction of the approximately cylindrical shape is along the rotation axis X. Each of the rear end portions (the front end portions) of the rubber pins 36a, 36b, 36c, 36d is disposed on corresponding one of the rubber pins 36a, 36b, 36c, 36d.

According to the configuration above, the rubber pins 36 can be easily formed and can be easily assembled to the housing 14 or the rear handle 18.

In one or more embodiments, the motor 26 is a brushless motor (an example of electric motor).

In the hedge trimmer 100 using an electric motor as the prime mover, vibrations caused by the prime mover being driven are reduced as compared with a hedge trimmer 100 using an engine as the prime mover, and thus backlash between the rear handle 18 and housing 14 greatly affects the user's feel during use. According to the configuration above, backlash between the rear handle 18 and the housing 14 can be reduced, and thus the user's comfort can be unproved.

What is claimed is:

1. A working machine comprising:
   a working part;
   a prime mover configured to drive the working part;
   a housing supporting the working part;
   a handle attached to the housing such that the handle is rotatable about a rotation axis with respect to the housing and configured to be grasped by a user; and
   an elastic member arranged between the housing and the handle,
   wherein
   the housing comprises a first surface,
   the handle comprises a second surface that faces the first surface in a rotation axis direction with an interval therebetween,
   the elastic member is arranged between the first surface and the second surface,
   a first end of the elastic member is held by one of the housing and the handle,
   a second end of the elastic member, which is opposite from the first end, contacts an other of the housing and the handle in the rotation axis direction, and
   when viewed in the rotation axis direction, the second end of the elastic member overlaps a portion, of the other of the housing and the handle, that the second end is in contact with.

2. The working machine according to claim 1, wherein
   one of the housing and the handle comprises a shaft portion that includes an outer surface, the outer surface decreasing in diameter in a first direction along the rotation axis,
   an other of the housing and the handle comprises an engaging portion configured to engage the outer surface of the shaft portion in the first direction, and
   the first surface and the second surface are offset to the engaging portion in the first direction with respect to the rotation axis direction.

3. The working machine according to claim 2, wherein
the elastic member comprises a plurality of contact portions that is discretely arranged in a circumferential direction of the rotation axis and configured to contact the first surface or the second surface,
the rotation axis is arranged inside a convex polygon that has centers of the plurality of contact portions as vertexes, as viewed in the rotation axis direction,
each of the plurality of contact portions comprises a rounded contact surface,
the elastic member comprises a plurality of elastic cylindrical members each having an approximately cylindrical shape, an axial direction of the approximately cylindrical shape being along the rotation axis,
each of the plurality of contact portions is disposed on corresponding one of the plurality of elastic cylindrical members, and
the prime mover is an electric motor.

4. The working machine according to claim 1, wherein the elastic member comprises a plurality of contact portions that is discretely arranged in a circumferential direction of the rotation axis and configured to contact the first surface or the second surface.

5. The working machine according to claim 4, wherein the rotation axis is arranged inside a convex polygon that has centers of the plurality of contact portions as vertexes, as viewed in the rotation axis direction.

6. The working machine according to claim 4, wherein each of the plurality of contact portions comprises a rounded contact surface.

7. The working machine according to claim 4, wherein
the elastic member comprises a plurality of elastic cylindrical members each having an approximately cylindrical shape, an axial direction of the approximately cylindrical shape being along the rotation axis, and
each of the plurality of contact portions is disposed on corresponding one of the plurality of elastic cylindrical members.

8. The working machine according to claim 1, wherein the prime mover is an electric motor.

9. A working machine comprising:
a working part;
a prime mover configured to drive the working part;
a housing supporting the working part;
a handle attached to the housing such that the handle is rotatable about a rotation axis with respect to the housing and configured to be grasped by a user; and
an elastic member arranged between the housing and the handle,
wherein
the housing comprises a first surface,
the handle comprises a second surface that faces the first surface with an interval therebetween,
the elastic member is arranged between the first surface and the second surface,
the elastic member comprises a plurality of contact portions that is discretely arranged in a circumferential direction of the rotation axis and configured to contact the first surface or the second surface,
the rotation axis is arranged inside a convex polygon that has centers of the plurality of contact portions as vertexes, as viewed in the rotation axis direction,
each of the plurality of contact portions comprises a rounded contact surface,
the elastic member comprises a plurality of elastic cylindrical members each having an approximately cylindrical shape, an axial direction of the approximately cylindrical shape being along the rotation axis,
each of the plurality of contact portions is disposed on corresponding one of the plurality of elastic cylindrical members, and
the prime mover is an electric motor.

* * * * *